United States Patent
Lee

(10) Patent No.: US 12,523,315 B2
(45) Date of Patent: Jan. 13, 2026

(54) PASSIVE TEMPERATURE CONTROLLED VALVE WITH TEMPERATURE RESPONSIVE POLYMER

(71) Applicant: Toyota Motor Engineering & Manufacturing North America, Inc., Plano, TX (US)

(72) Inventor: Jae Seung Lee, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/193,728

(22) Filed: Mar. 31, 2023

(65) Prior Publication Data
US 2024/0328527 A1 Oct. 3, 2024

(51) Int. Cl.
F16K 31/00 (2006.01)
F16K 11/22 (2006.01)
F16K 49/00 (2006.01)

(52) U.S. Cl.
CPC .......... *F16K 31/002* (2013.01); *F16K 49/00* (2013.01); *F16K 11/22* (2013.01)

(58) Field of Classification Search
CPC ........ F16K 31/002; F16K 11/22; F16K 49/00; F16K 17/38; Y10T 137/7963; Y10T 137/7737

(Continued)

(56) References Cited

U.S. PATENT DOCUMENTS 2,319,498 A * 5/1943 Gerard .................... F25B 41/30
62/223
2,902,222 A * 9/1959 Noakes ................ G05D 23/022
236/93 R (Continued)

FOREIGN PATENT DOCUMENTS

WO WO-2020197584 A1 * 10/2020

OTHER PUBLICATIONS

Advanced Cooling Technologies, "Act Thermal Passive Valve", https://www.1-act.com/hvac/act-thermal-passive-valve/, retrieved Mar. 30, 2023, 7 pages.

(Continued)

*Primary Examiner* — Jessica Cahill
(74) *Attorney, Agent, or Firm* — Jordan IP Law, LLC

(57) ABSTRACT

A system including: a temperature responsive polymer configured to expand to a cross-sectional area of a fluid channel when a temperature of the fluid in the fluid channel is greater than or equal to a temperature threshold $T_{th}$, and to retract to less than the cross-sectional area when the temperature of the fluid in the fluid channel is less than $T_{th}$, an expandable material layer surrounding the temperature responsive polymer and configured to expand and retract with the expansion and retraction of the temperature responsive polymer, and a sieve housing encasing the expandable material and being configured to be disposed in the fluid channel, wherein when the temperature of the fluid in the fluid channel is greater than or equal to $T_{th}$, the temperature responsive polymer expands to the cross-sectional area such that the expandable material layer prevents the fluid in the fluid channel from passing through the sieve housing.

20 Claims, 13 Drawing Sheets

(58) Field of Classification Search
USPC .......................................................... 251/11
See application file for complete search history.

(56) References Cited

U.S. PATENT DOCUMENTS

| | | | | |
|---|---|---|---|---|
| 3,038,664 A * | 6/1962 | Kingsley | ................... | G05B 9/05 |
| | | | | 236/93 B |
| 3,904,111 A * | 9/1975 | Petersson | ............. | G05D 7/0186 |
| | | | | 138/140 |
| 4,072,159 A * | 2/1978 | Kurosawa | ................. | A62C 2/04 |
| | | | | 166/57 |
| 5,642,859 A * | 7/1997 | Ackroyd | .................. | E03C 1/041 |
| | | | | 236/93 B |
| 2006/0122565 A1 | 6/2006 | Kooi | | |
| 2010/0193045 A1* | 8/2010 | Xu | ......................... | F17C 13/025 |
| | | | | 137/255 |
| 2019/0277420 A1* | 9/2019 | Keith | .................... | F16K 31/002 |

OTHER PUBLICATIONS

Iwasaki, Wataru et al., "A thermoresponsive valve to control fluid flow in microfluidic paper-based devices", Research paper, Microfluidics and Nanofluidics (2022) 26:47, https://doi.org/10.1007/s10404-022-02552-0, 9 pages.

Wikipedia, Temperature-responsive polymer, Retrieved from https://en.wikipedia.org/w/index.php?title=Temperature-responsive_polymer&oldid=1122220061, last edited Nov. 16, 2022, 17 pages.

\* cited by examiner

PASSIVE TEMPERATURE CONTROLLED VALVE WITH TEMPERATURE RESPONSIVE POLYMER

TECHNICAL FIELD

One or more embodiments relate generally to systems and methods for controlling fluid distribution.

BACKGROUND

A temperature controlled valve system has been realized with sensor-activated electric valve systems, wherein where temperature of the flow is measured to control open/close a valve. In some systems, for example, a sensor is used to activate a Peltier device, that in turn heats a temperature actuate valve.

In some prior art passive temperature controlled valve systems, the passive valve "incorporates a phase change actuated valve mechanism." The phase change valve mechanism opens and closes based on the heat pipes refrigerant temperature. However, these prior art systems require expensive parts and those parts need to be precisely packaged. As a result, miniaturization and cost efficiency are a challenge.

What is needed is a passive temperature controlled valve system that does not require a refrigerant or mechanical moving parts.

SUMMARY

An aspect of the present disclosure is drawn to a system for use with a fluid channel and a fluid, wherein the fluid channel has a cross-sectional area and is configured to pass the fluid, and wherein the system includes: a temperature responsive polymer configured to expand to the cross-sectional area when a temperature of the fluid in the fluid channel is greater than or equal to a temperature threshold $T_{th}$, and to retract to less than the cross-sectional area when the temperature of the fluid in the fluid channel is less than $T_{th}$; an expandable material layer surrounding the temperature responsive polymer and being configured to expand and retract with the expansion and retraction of the temperature responsive polymer; and a sieve housing encasing the expandable material and being configured to be disposed in the fluid channel, wherein when the temperature of the fluid in the fluid channel is greater than or equal to $T_{th}$, the temperature responsive polymer expands to the cross-sectional area such that the expandable material layer prevents the fluid in the fluid channel from passing through the sieve housing, and wherein when the temperature of the fluid in the fluid channel is less than $T_{th}$, the temperature responsive polymer retracts to less than the cross-sectional area such that the expandable material layer enables the fluid in the fluid channel to pass through the sieve housing.

In some embodiments of this aspect, the system further includes: a second temperature responsive polymer configured to expand to the cross-sectional area when a temperature of the fluid in the fluid channel is greater than or equal to a second temperature threshold $T_{th2}$, and to retract to less than the cross-sectional area when the temperature of the fluid in the fluid channel is less than $T_{th2}$; a second expandable material layer surrounding the second temperature responsive polymer and being configured to expand and retract with the expansion and retraction of the second temperature responsive polymer; and a second sieve housing encasing the second expandable material, wherein when the temperature of the fluid in the fluid channel is greater than or equal to $T_{th2}$, the second temperature responsive polymer expands to the cross-sectional area such that the second expandable material layer prevents the fluid in the fluid channel from passing through the second sieve housing, and wherein when the temperature of the fluid in the fluid channel is less than $T_{th2}$, the second temperature responsive polymer retracts to less than the cross-sectional area such that the second expandable material layer enables the fluid in the fluid channel to pass through the second sieve housing. In some of these embodiments, $T_{th} \neq T_{th2}$.

In some embodiments of this aspect, when the temperature of the fluid, as a liquid, in the fluid channel is greater than or equal to $T_{th}$, the temperature responsive polymer expands to the cross-sectional area such that the expandable material layer prevents the fluid, as a liquid, in the fluid channel from passing through the sieve housing, and when the temperature of the fluid, as a liquid, in the fluid channel is less than $T_{th}$, the temperature responsive polymer retracts to less than the cross-sectional area such that the expandable material layer enables the fluid, as a liquid, in the fluid channel to pass through the sieve housing.

In some embodiments of this aspect, when the temperature of the fluid, as a gas, in the fluid channel is greater than or equal to $T_{th}$, the temperature responsive polymer expands to the cross-sectional area such that the expandable material layer prevents the fluid, as a gas, in the fluid channel from passing through the sieve housing, and when the temperature of the fluid, as a gas, in the fluid channel is less than $T_{th}$, the temperature responsive polymer retracts to less than the cross-sectional area such that the expandable material layer enables the fluid, as a gas, in the fluid channel to pass through the sieve housing.

Another aspect of the present disclosure is drawn to a fluid distribution system for use with a fluid, wherein the fluid distribution system includes: a fluid channel having a cross-sectional area and being configured to pass the fluid; a temperature responsive polymer configured to expand to the cross-sectional area when a temperature of the fluid in the fluid channel is greater than or equal to a temperature threshold $T_{th}$, and to retract to less than the cross-sectional area when the temperature of the fluid in the fluid channel is less than $T_th$; an expandable material layer surrounding the temperature responsive polymer and being configured to expand and retract with the expansion and retraction of the temperature responsive polymer; and a sieve housing encasing the expandable material and being configured to be disposed in the fluid channel, wherein when the temperature of the fluid in the fluid channel is greater than or equal to $T_{th}$, the temperature responsive polymer expands to the cross-sectional area such that the expandable material layer prevents the fluid in the fluid channel from passing through the sieve housing, and wherein when the temperature of the fluid in the fluid channel is less than $T_{th}$, the temperature responsive polymer retracts to less than the cross-sectional area such that the expandable material layer enables the fluid in the fluid channel to pass through the sieve housing.

In some embodiments of this aspect, the fluid distribution system further includes: a second temperature responsive polymer configured to expand to the cross-sectional area when a temperature of the fluid in the fluid channel is greater than or equal to a second temperature threshold $T_{th2}$, and to retract to less than the cross-sectional area when the temperature of the fluid in the fluid channel is less than $T_{th2}$; a second expandable material layer surrounding the second temperature responsive polymer and being configured to expand and retract with the expansion and retraction of the second temperature responsive polymer; and a second sieve housing encasing the second expandable material, wherein when the temperature of the fluid in the fluid channel is greater than or equal to $T_{th2}$, the second temperature responsive polymer expands to the cross-sectional area such that the second expandable material layer prevents the fluid in the fluid channel from passing through the second sieve housing, and wherein when the temperature of the fluid in the fluid channel is less than $T_{th2}$, the second temperature responsive polymer retracts to less than the cross-sectional area such that the second expandable material layer enables the fluid in the fluid channel to pass through the second sieve housing. In some embodiments of this aspect, $T_{th} \neq T_{th2}$.

In some embodiments of this aspect, the system further includes a flow activated chiller disposed between the sieve housing and the second sieve housing and configured to cool a portion of the fluid between the sieve housing and the second sieve housing. In some of these embodiments, $T_{th} > T_{th2}$. In some of these embodiments, the system further includes a reverse check valve configured to prevent the fluid from flowing from the second sieve housing to the sieve housing.

In some embodiments of this aspect, when the temperature of the fluid, as a liquid, in the fluid channel is greater than or equal to $T_{th}$, the temperature responsive polymer expands to the cross-sectional area such that the expandable material layer prevents the fluid, as a liquid, in the fluid channel from passing through the sieve housing, and when the temperature of the fluid, as a liquid, in the fluid channel is less than $T_{th}$, the temperature responsive polymer retracts to less than the cross-sectional area such that the expandable material layer enables the fluid, as a liquid, in the fluid channel to pass through the sieve housing.

In some embodiments of this aspect, when the temperature of the fluid, as a gas, in the fluid channel is greater than or equal to $T_{th}$, the temperature responsive polymer expands to the cross-sectional area such that the expandable material layer prevents the fluid, as a gas, in the fluid channel from passing through the sieve housing, and when the temperature of the fluid, as a gas, in the fluid channel is less than $T_{th}$, the temperature responsive polymer retracts to less than the cross-sectional area such that the expandable material layer enables the fluid, as a gas, in the fluid channel to pass through the sieve housing.

Another aspect of the present disclosure is drawn to a method of distributing fluid, wherein the method includes: flowing fluid into a fluid channel having a cross-sectional area and being configured to pass the fluid; flowing the fluid to a device within the fluid channel, the device including: a temperature responsive polymer configured to expand to the cross-sectional area when a temperature of the fluid in the fluid channel is greater than or equal to a temperature threshold $T_{th}$, and to retract to less than the cross-sectional area when the temperature of the fluid in the fluid channel is less than $T_{th}$; an expandable material layer surrounding the temperature responsive polymer and being configured to expand and retract with the expansion and retraction of the temperature responsive polymer; and a sieve housing encasing the expandable material and being configured to be disposed in the fluid channel, wherein when the temperature of the fluid in the fluid channel is greater than or equal to $T_{th}$, the temperature responsive polymer expands to the cross-sectional area such that the expandable material layer prevents the fluid in the fluid channel from passing through the sieve housing, and wherein when the temperature of the fluid in the fluid channel is less than $T_{th}$, the temperature responsive polymer retracts to less than the cross-sectional area such that the expandable material layer enables the fluid in the fluid channel to pass through the sieve housing.

In some of these embodiments, the method further includes: flowing the fluid to a second device within the fluid channel, the second device including: a second temperature responsive polymer configured to expand to the cross-sectional area when a temperature of the fluid in the fluid channel is greater than or equal to a second temperature threshold $T_{th2}$, and to retract to less than the cross-sectional area when the temperature of the fluid in the fluid channel is less than $T_{th2}$; a second expandable material layer surrounding the second temperature responsive polymer and being configured to expand and retract with the expansion and retraction of the second temperature responsive polymer; and a second sieve housing encasing the second expandable material, wherein when the temperature of the fluid in the fluid channel is greater than or equal to $T_{th2}$, the second temperature responsive polymer expands to the cross-sectional area such that the second expandable material layer prevents the fluid in the fluid channel from passing through the second sieve housing, and wherein when the temperature of the fluid in the fluid channel is less than $T_{th2}$, the second temperature responsive polymer retracts to less than the cross-sectional area such that the second expandable material layer enables the fluid in the fluid channel to pass through the second sieve housing. In some of these embodiments, $T_{th} \neq T_{th2}$. In some of these embodiments, the method further includes flowing the fluid through a flow activated chiller disposed between the sieve housing and the second sieve housing and configured to cool a portion of the fluid between the sieve housing and the second sieve housing. In some of these embodiments, $T_{th} > T_{th2}$. In some of these embodiments, the method further includes flowing the fluid through a reverse check valve configured to prevent the fluid from flowing from the second sieve housing to the sieve housing.

In some embodiments of this aspect, when the temperature of the fluid, as a liquid, in the fluid channel is greater than or equal to $T_{th}$, the temperature responsive polymer expands to the cross-sectional area such that the expandable material layer prevents the fluid, as a liquid, in the fluid channel from passing through the sieve housing, and when the temperature of the fluid, as a liquid, in the fluid channel is less than $T_{th}$, the temperature responsive polymer retracts to less than the cross-sectional area such that the expandable material layer enables the fluid, as a liquid, in the fluid channel to pass through the sieve housing.

BRIEF SUMMARY OF THE DRAWINGS

The accompanying drawings, which are incorporated in and form a part of the specification, illustrate and explain example embodiments. In the drawings.

DETAILED DESCRIPTION

A system in accordance with aspect of the present disclosure provides a passive temperature controlled valve system that does not require a refrigerant or mechanical moving parts.

In accordance with aspects of the present disclosure, a temperature responsive polymer (TRP) is used as a passive actuator. Temperature-responsive polymers or thermoresponsive polymers (TRPs) are polymers that exhibit drastic and discontinuous changes in their physical properties with temperature. The term is commonly used when the property concerned is solubility in a given solvent, but it may also be used when other properties are affected. TRPs belong to the class of stimuli-responsive materials, in contrast to temperature-sensitive (for short, thermosensitive) materials, which change their properties continuously with environmental conditions. In a stricter sense, TRPs display a miscibility gap in their temperature-composition diagram. Depending on whether the miscibility gap is found at high or low temperatures, either an upper critical solution temperature (UCST) or a lower critical solution temperature (LCST) exists.

In accordance with aspects of the present disclosure, TRPs materials are chosen in which the volume of the material is the physical property that changes as a function of temperature, a non-limiting example of which includes polypropylene. In particular, the TRP expands or shrinks its volume above or below a lower critical solution temperature (LCST) or an upper critical solution temperature (UCST). Either critical temperature can be engineered by changing the chemical composition of the TRP.

The TRP may be packaged in a thermally transparent, physically robust but expandable material layer. The TRP packaged in the expandable material layer can be placed in, sieve or a 'tea strainer' type holder. The packaged TRP may be placed in a fluid channel, wherein fluid can flow by the TRP in the expandable material layer, which is encased in the strainer, when the TRP is below the critical temperature and is not expanded to the obstruct the entire cross-section of the fluid channel. On the other hand, when the TRP is heated to the UCST, the TRP will expand and obstruct the entire cross-section of the fluid channel, and will therefore stop fluid flow in the channel.

Example systems and methods for passively controlling fluid distribution in accordance with aspects of the present disclosure will now be described in greater detail with reference to FIGS. 1A-6.

Figure 1A:
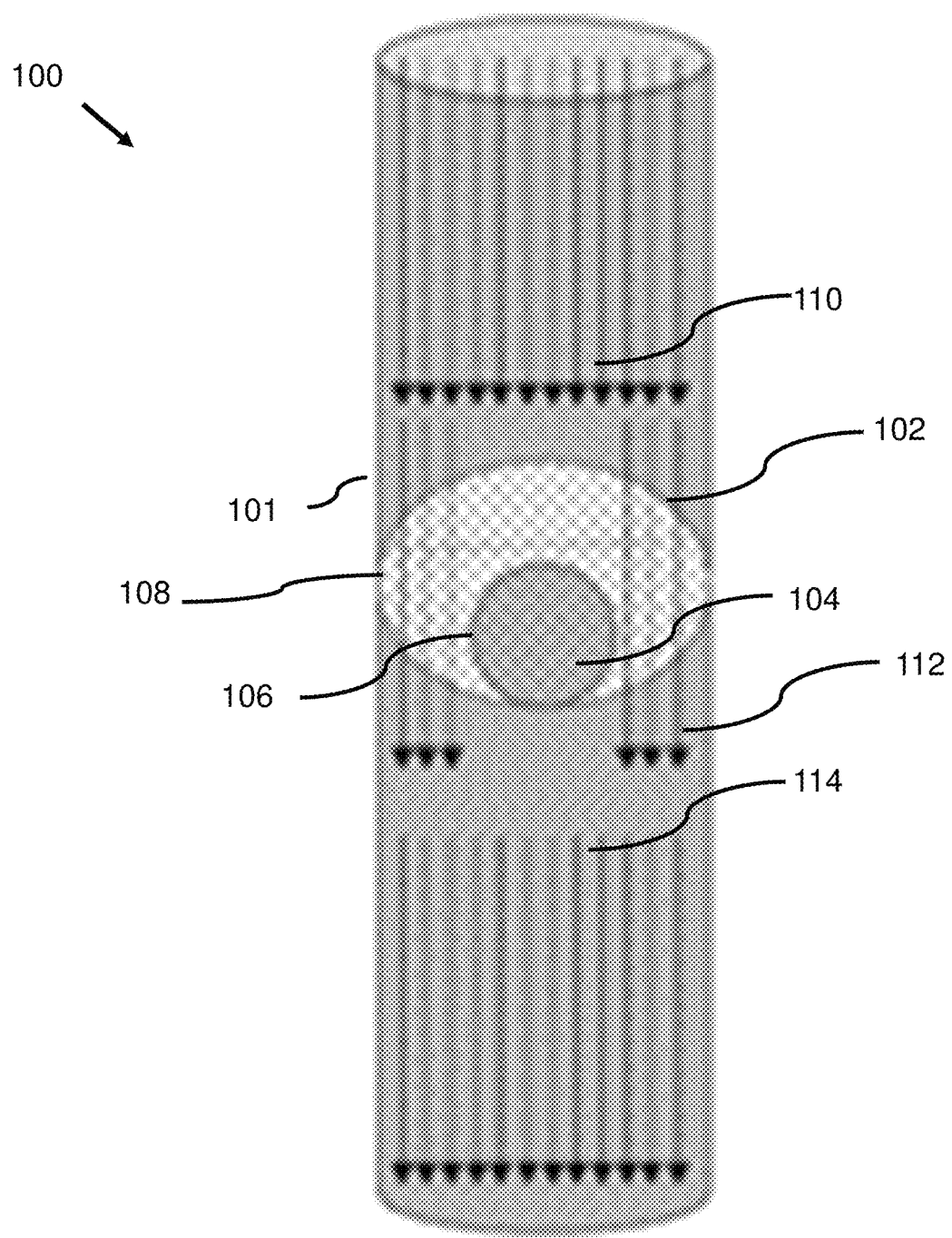
FIG. 1A illustrates a basic fluid distribution system in accordance with aspects of the present disclosure at a time, $t_0$.

FIG. 1A illustrates a basic fluid distribution system 100 in accordance with aspects of the present disclosure at a time, to.

As shown in the figure, fluid distribution system 100 includes a fluid channel 101, and a fluid controlling system 102. Fluid controlling system 102 includes a TRP 104, an expandable material layer (EML) 106 surrounding TRP 104, and a sieve housing 108 encasing EML 106. A fluid flows through fluid channel 101 as shown by arrows 110.

TRP 104 is configured to expand to the cross-sectional area of fluid channel 101 when a temperature of the fluid in the fluid channel is greater than or equal to a temperature threshold $T_{th}$, and to retract to less than the cross-sectional area when the temperature of the fluid in the fluid channel is less than $T_{th}$. $T_{th}$ is an intrinsic property of TRP 104, wherein one of skill in the art may choose a material for TRP 104 to obtain a respective $T_{th}$.

EML 106 surrounds TRP 104 and is configured to expand and retract with the expansion and retraction of TRP 104. EML 106 may comprise any known polymer that has enough elasticity and strength against the flow and maximum temperature.

Sieve housing 108 encases EML 106 and is configured to be disposed in fluid channel 101. Sieve housing 108 enables the fluid to pass through sieve housing 108, while retaining EML 106.

For purposes of discussion, at time to, the temperature of the fluid in fluid channel 101 is less than $T_{th}$. As such, TRP 104 is contracted, enabling the fluid to pass through sieve housing 108 as shown by arrow 112, and to continue flowing through fluid channel 101 as shown by arrows 114.

Figure 1B:
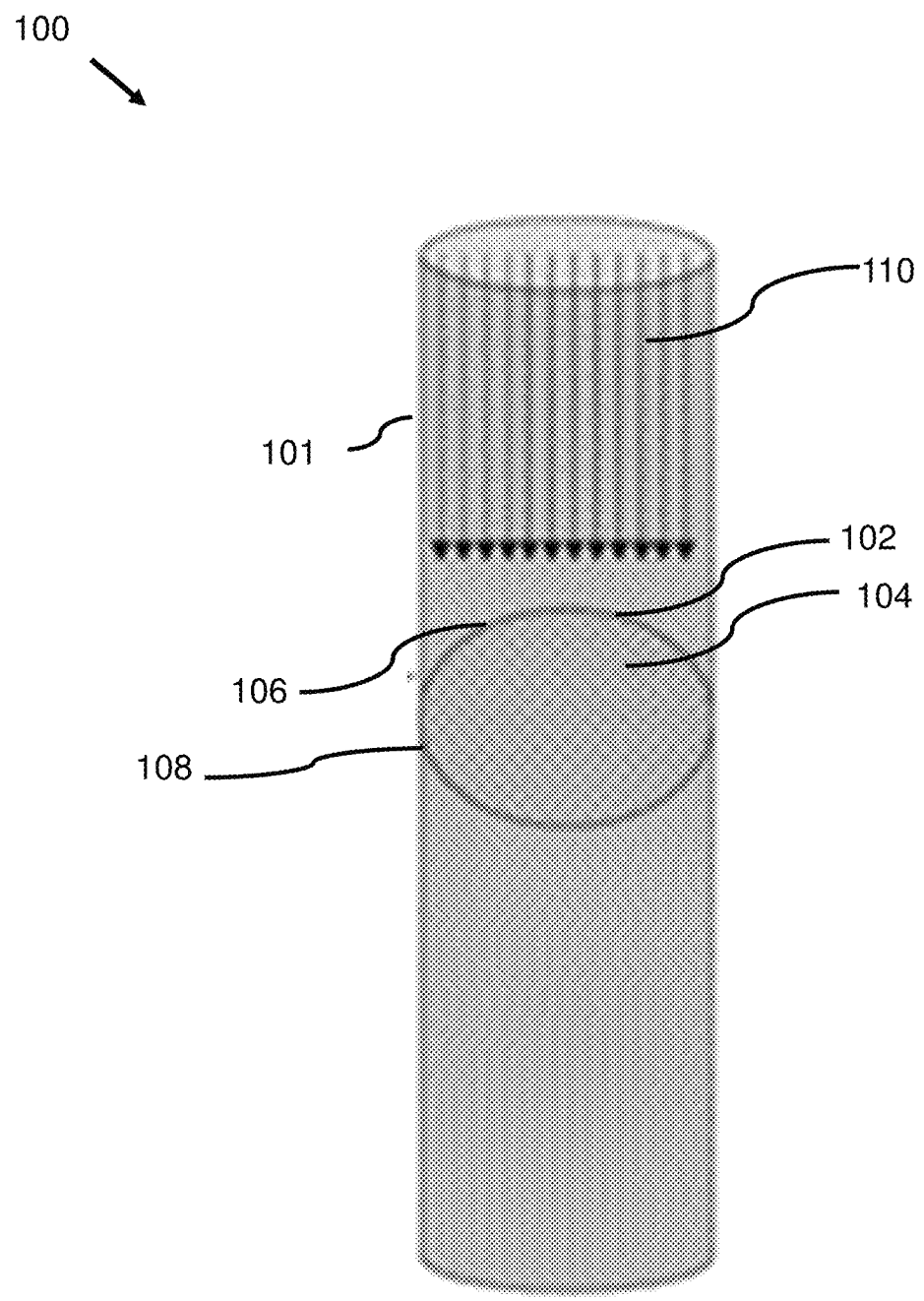
FIG. 1B illustrates the basic fluid distribution system of FIG. 1A at a time, $t_1$.

FIG. 1B illustrates fluid distribution system 100 at a time, $t_1$.

In FIG. 1B, the temperature of the fluid in fluid channel 101 is greater than $T_{th}$. As such, TRP 104 has expanded to fill the cross-sectional area of fluid channel 101. Therefore, TRP 104 (and the encasing EML 106) prevent the fluid from passing through sieve housing 108.

In other words, in fluid distribution system 100 is in an Open state in FIG. 1A, when the temperature of the fluid in fluid channel 101 less than or equal to $T_{th}$, and is in a Closed state in FIG. 1B, when the temperature of the fluid in fluid channel 101 is greater than $T_{th}$.

This passive heat responsive valve system may be expanded to multiple valves, as will be described in greater detail with reference to FIGS. 2A-3.

Figure 2A:
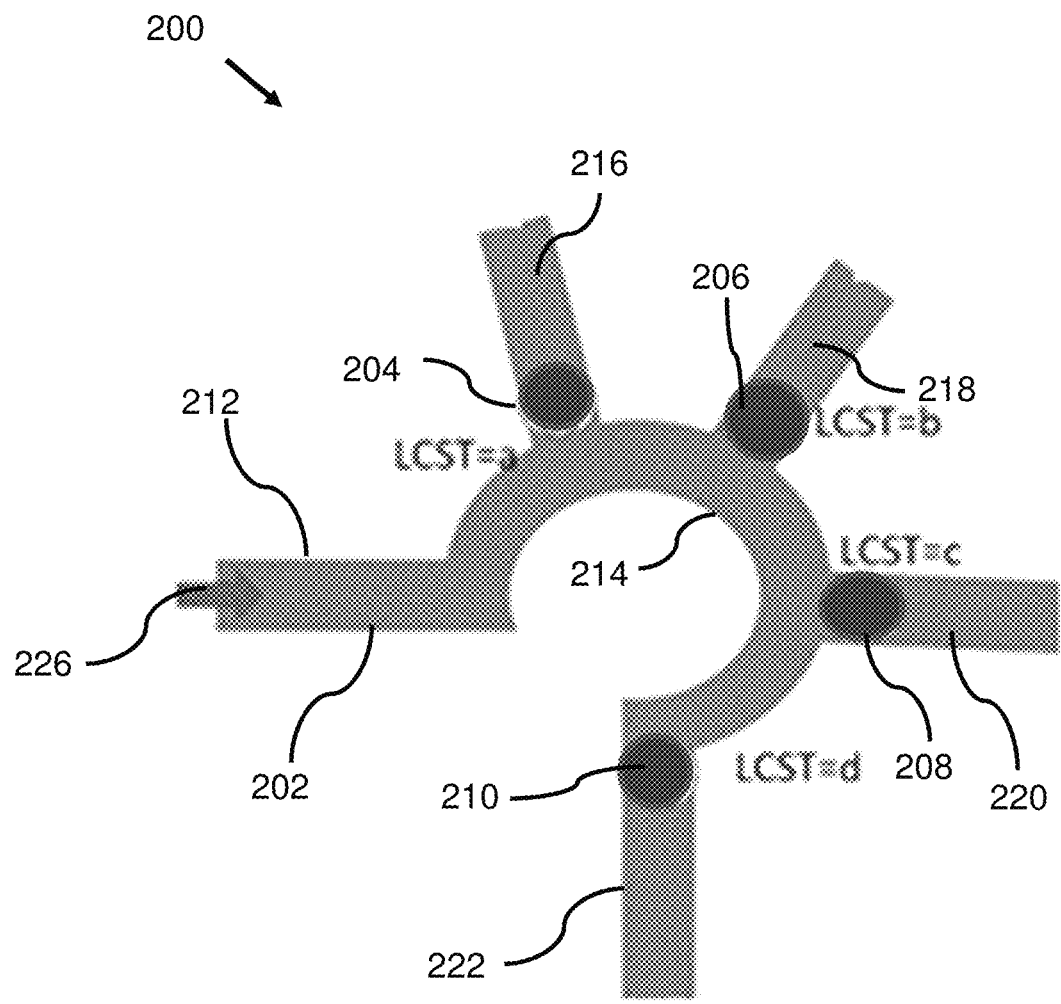
FIG. 2A illustrates a fluid distribution system in accordance with aspects of the present disclosure at a time, $t_2$.

FIG. 2A illustrates a fluid distribution system 200 in accordance with aspects of the present disclosure at a time, $t_2$.

As shown in the figure, fluid distribution system 200 includes a fluid channel 202, and fluid controlling systems 204, 206, 208, and 210. Further, fluid channel 202 includes an input portion 212, a central connecting portion 214, a branch 216, a branch 218, a branch 220 and a branch 222.

Fluid controlling system 204 is disposed within branch 216. Fluid controlling system 206 is disposed within branch 218. Fluid controlling system 208 is disposed within branch 220. Fluid controlling system 210 is disposed within branch 222.

Each of fluid controlling systems 204, 206, 208, and 210 have a similar structure to that of fluid controlling system 102 discussed above with reference to FIGS. 1A-B. However, in this embodiment, the TRP in each of fluid controlling systems 204, 206, 208, and 210 are configured to expand at a different respective LCST.

For purposes of discussion only, let: the TRP of fluid controlling system 204 have an LCST, $T_{204}$, be between 50 and 40 degrees Celsius, i.e., $50 > T_{204} > 40$; the TRP of fluid controlling system 206 have an LCST, $T_{206}$, be between 40 and 30 degrees Celsius, i.e., $40 > T_{206} > 30$; the TRP of fluid controlling system 208 have an LCST, $T_{208}$, be between 30 and 20 degrees Celsius, i.e., $30 > T_{208} > 20$; and the TRP of fluid controlling system 210 have an LCST, $T_{210}$, be less than 20 i.e., $20 > T_{210}$.

For purposes of discussion, at time $t_2$, let the temperature of the fluid flowing into input portion 212, as shown by arrow 226, have a temperature that is greater than 50. Such a heated fluid will flow into central connecting portion 214 and contact each of fluid controlling systems 204, 206, 208, and 210. Accordingly, the TRP in each of fluid controlling systems 204, 206, 208, and 210 will expanded so as to prevent the fluid from passing into any of branches 216, 218, 220, and 224.

However, if the temperature of the fluid in central connecting portion 214 were to drop to $T_{204}$, then the fluid will be able to pass into branch 216. This will be described in greater detail with reference to FIG. 2B.

Figure 2B:
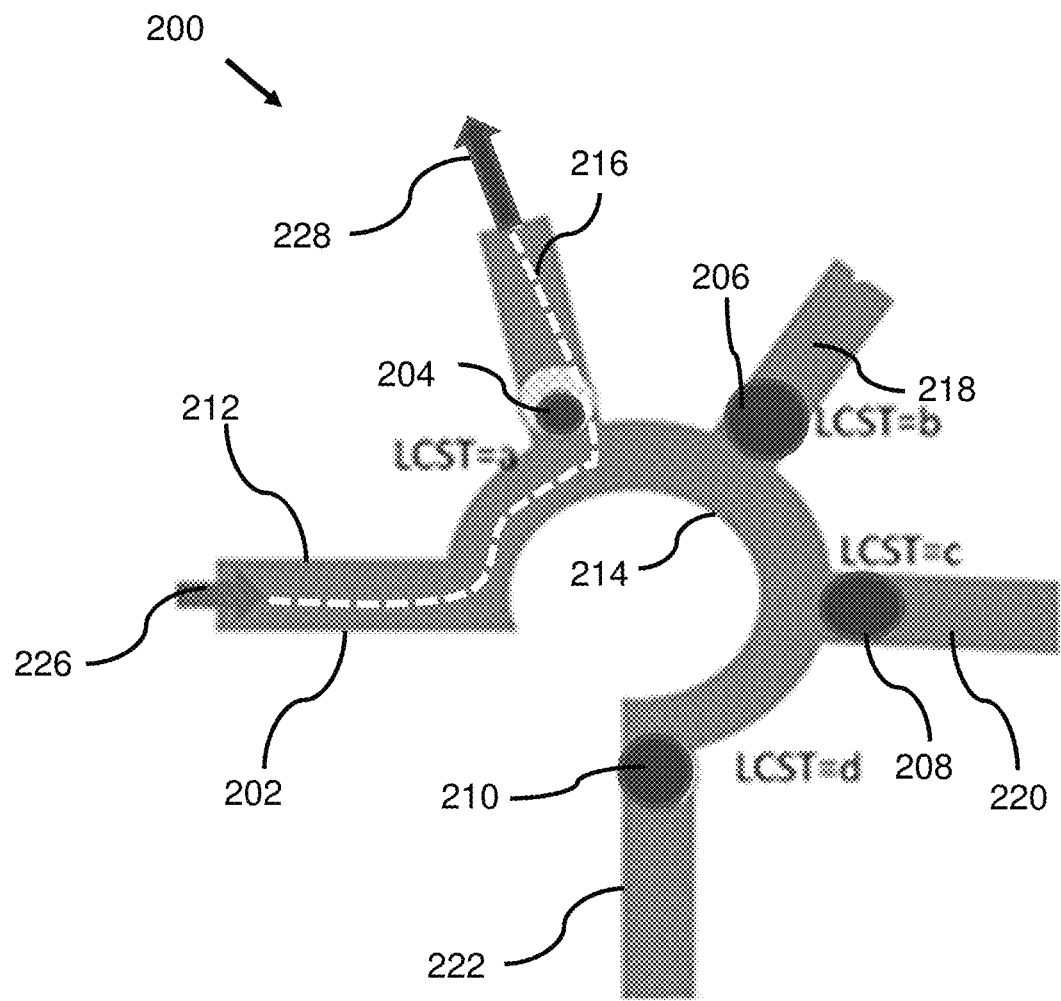
FIG. 2B illustrates the fluid distribution system of FIG. 2A at a time, $t_3$.

FIG. 2B illustrates fluid distribution system 200 at a time, $t_3$. This figure illustrates that state of fluid distribution system 200 when the temperature of the fluid in central connecting portion 214 drops to $T_{204}$.

As shown in the figure, the TRP in fluid controlling system 204 has contracted with the decrease in temperature of the fluid in central connecting portion 214. Accordingly, the sieve housing of fluid controlling system 204 enables the fluid in central connecting portion 214 to pass through fluid controlling system 204 and to branch 216 and out as output 228.

If the temperature of the fluid in central connecting portion 214 were to drop further to $T_{206}$, then the fluid will be able to additionally pass into branch 218. This will be described in greater detail with reference to FIG. 2C.

Figure 2C:
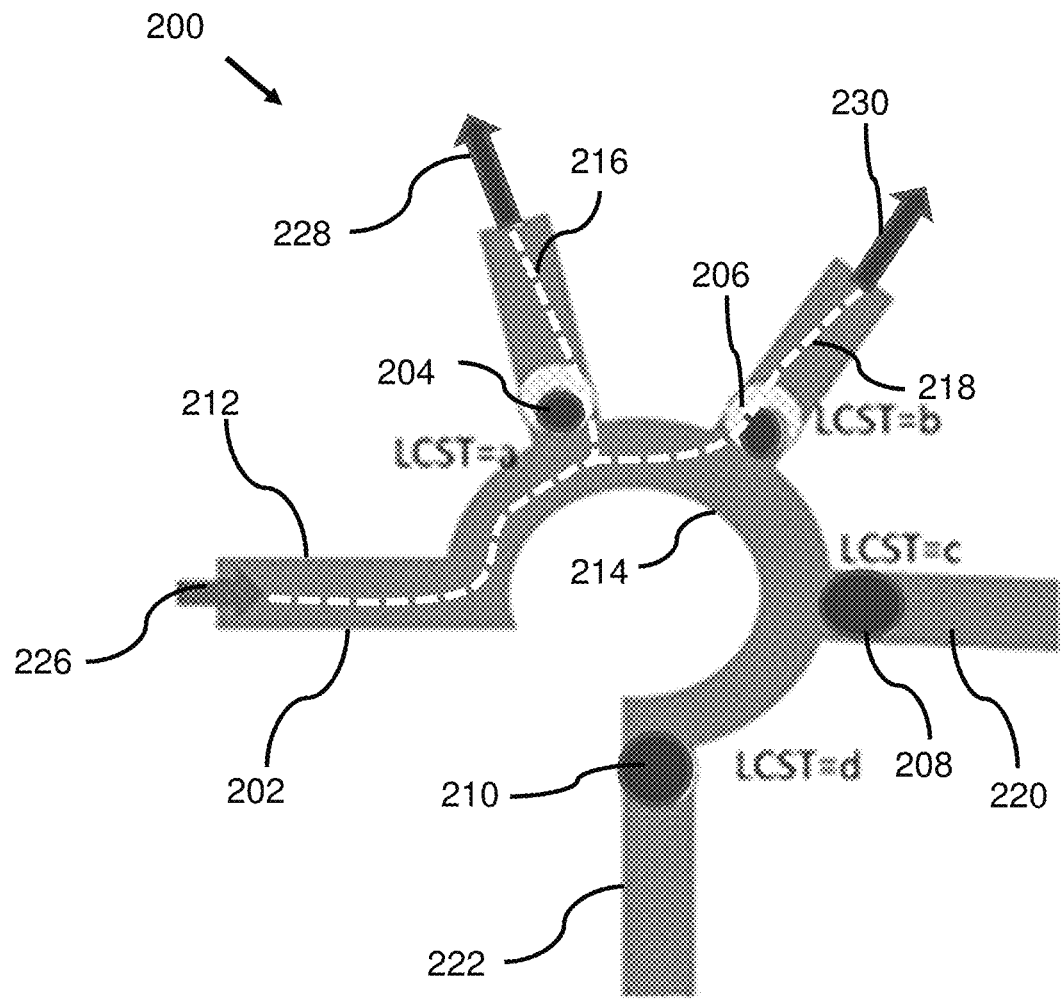
FIG. 2C illustrates the fluid distribution system of FIG. 2A at a time, $t_4$.

FIG. 2C illustrates fluid distribution system 200 at a time, $t_4$. This figure illustrates that state of fluid distribution system 200 when the temperature of the fluid in central connecting portion 214 drops to $T_{206}$.

As shown in the figure, the TRP in fluid controlling system 206 has contracted with the decrease in temperature of the fluid in central connecting portion 214. Accordingly, the sieve housing of fluid controlling system 206 enables the fluid in central connecting portion 214 to pass through fluid controlling system 206 and to branch 218 and out as output 230. Therefore, in this example embodiment, when the temperature of the fluid in central connecting portion 214 drops to $T_{206}$, fluid passes into branch 216 and branch 218.

If the temperature of the fluid in central connecting portion 214 were to further drop to $T_{208}$, then the fluid will be able to additionally pass into branch 220. This will be described in greater detail with reference to FIG. 2D.

Figure 2D:
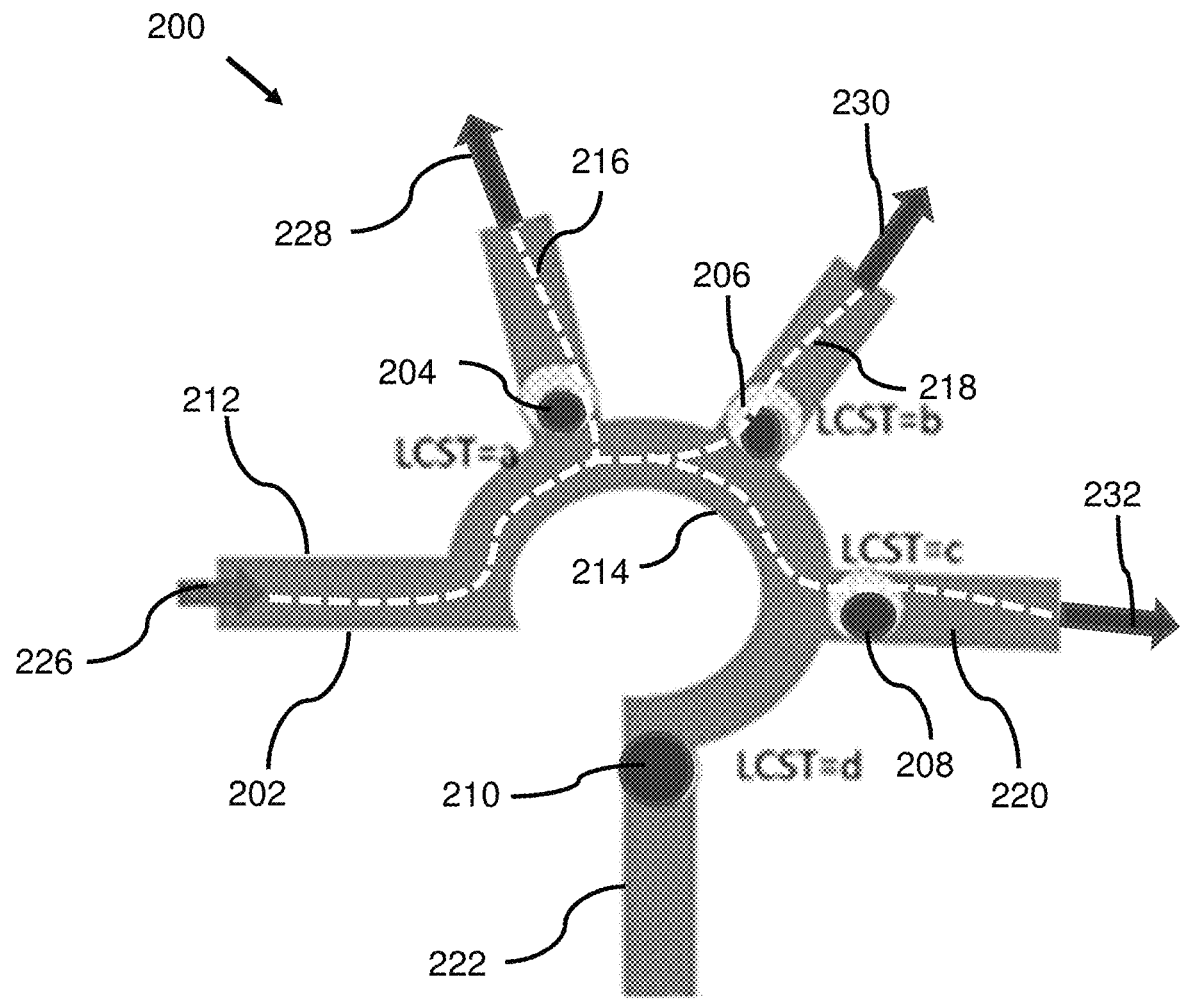
FIG. 2D illustrates the fluid distribution system of FIG. 2A at a time, $t_5$.

FIG. 2D illustrates fluid distribution system 200 at a time, $t_5$. This figure illustrates that state of fluid distribution system 200 when the temperature of the fluid in central connecting portion 214 drops to $T_{208}$.

As shown in the figure, the TRP in fluid controlling system 208 has contracted with the decrease in temperature of the fluid in central connecting portion 214. Accordingly, the sieve housing of fluid controlling system 208 enables the fluid in central connecting portion 214 to pass through fluid controlling system 208 and to branch 220 and out as output 232. Therefore, in this example embodiment, when the temperature of the fluid in central connecting portion 214 drops to $T_{208}$, fluid passes into branch 216, branch 218 and branch 220.

If the temperature of the fluid in central connecting portion 214 were to drop to $T_{210}$, then the fluid will be able to pass into branch 222. This will be described in greater detail with reference to FIG. 2E.

Figure 2E:
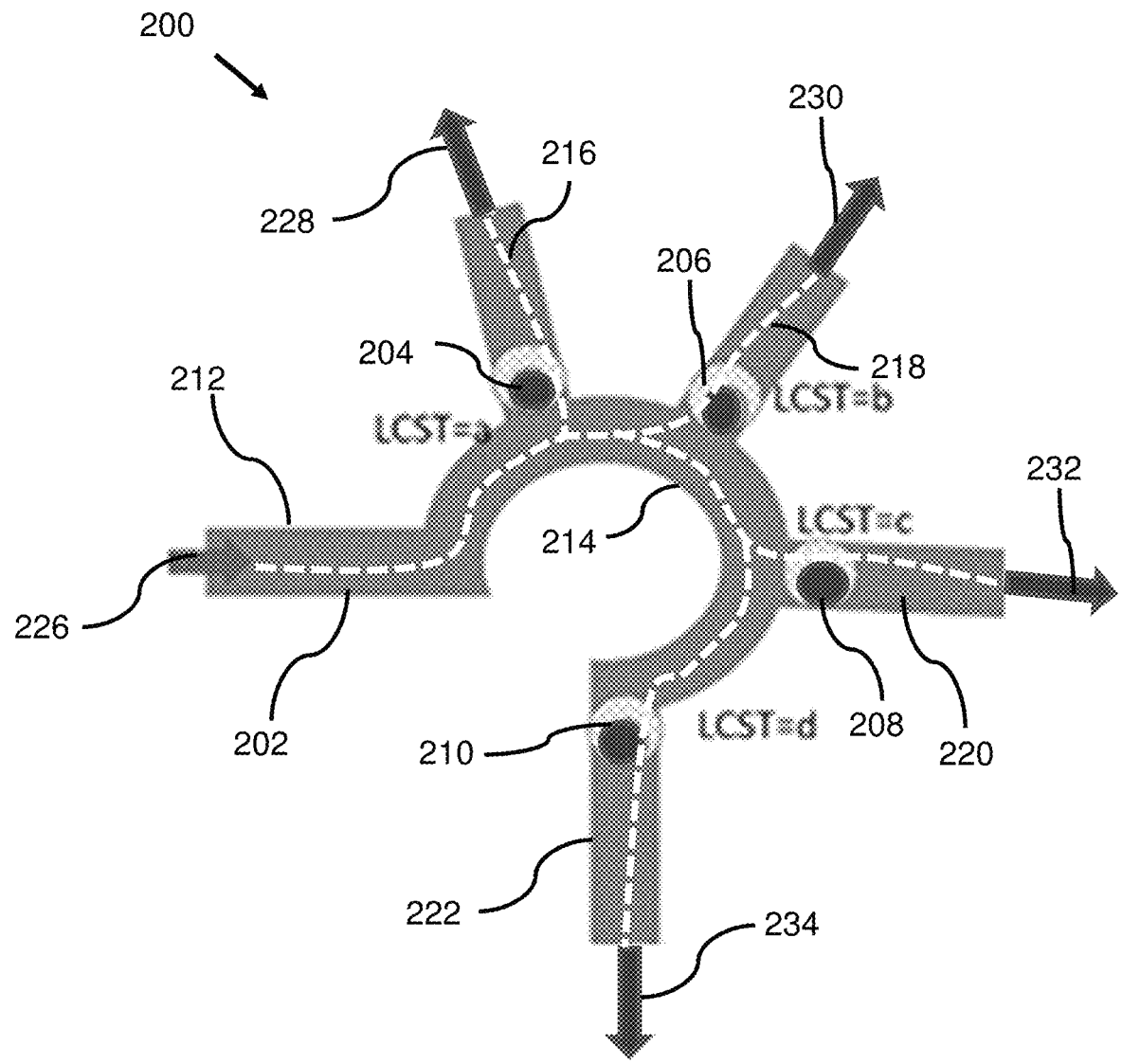
FIG. 2E illustrates the fluid distribution system of FIG. 2A at a time, $t_6$.

FIG. 2E illustrates fluid distribution system 200 at a time, $t_6$. This figure illustrates that state of fluid distribution system 200 when the temperature of the fluid in central connecting portion 214 drops to $T_{210}$.

As shown in the figure, the TRP in fluid controlling system 210 has contracted with the decrease in temperature of the fluid in central connecting portion 214. Accordingly, the sieve housing of fluid controlling system 210 enables the fluid in central connecting portion 214 to pass through fluid controlling system 210 and to branch 222 and out as output 234. Therefore, in this example embodiment, when the temperature of the fluid in central connecting portion 214 drops to $T_{210}$, fluid passes into branch 216, branch 218, branch 220, and branch 222.

Fluid distribution system 200 may be useful in situations where the fluid may be utilized by different systems at different temperatures. In particular, for purposes of discussion, let one system require the fluid at a temperature that is greater than $T_{206}$, but less than $T_{204}$. In such a case, branch 216 may deliver the fluid to such a system at that temperature using the passive valve function of fluid controlling system 204. Similarly, let another system require the fluid at a temperature that is greater than $T_{208}$, but less than $T_{206}$. In such a case, branch 218 may deliver the fluid to such a system at that temperature using the passive valve function of fluid controlling system 206. Further, let another system require the fluid at a temperature that is greater than $T_{210}$, but less than $T_{208}$. In such a case, branch 220 may deliver the fluid to such a system at that temperature using the passive valve function of fluid controlling system 208. Finally, let another system require the fluid at a temperature that is less than $T_{210}$. In such a case, branch 222 may deliver the fluid to such a system at that temperature using the passive valve function of fluid controlling system 210.

It should be noted that a fluid controlling system in accordance with aspects of the present disclosure need not be disposed within a branch to prevent flow into that branch. In particular, a fluid controlling system in accordance with aspects of the present disclosure may be disposed adjacent to a branch to prevent flow into that branch. This will be described in greater detail with reference to FIG. 3.

Figure 3:
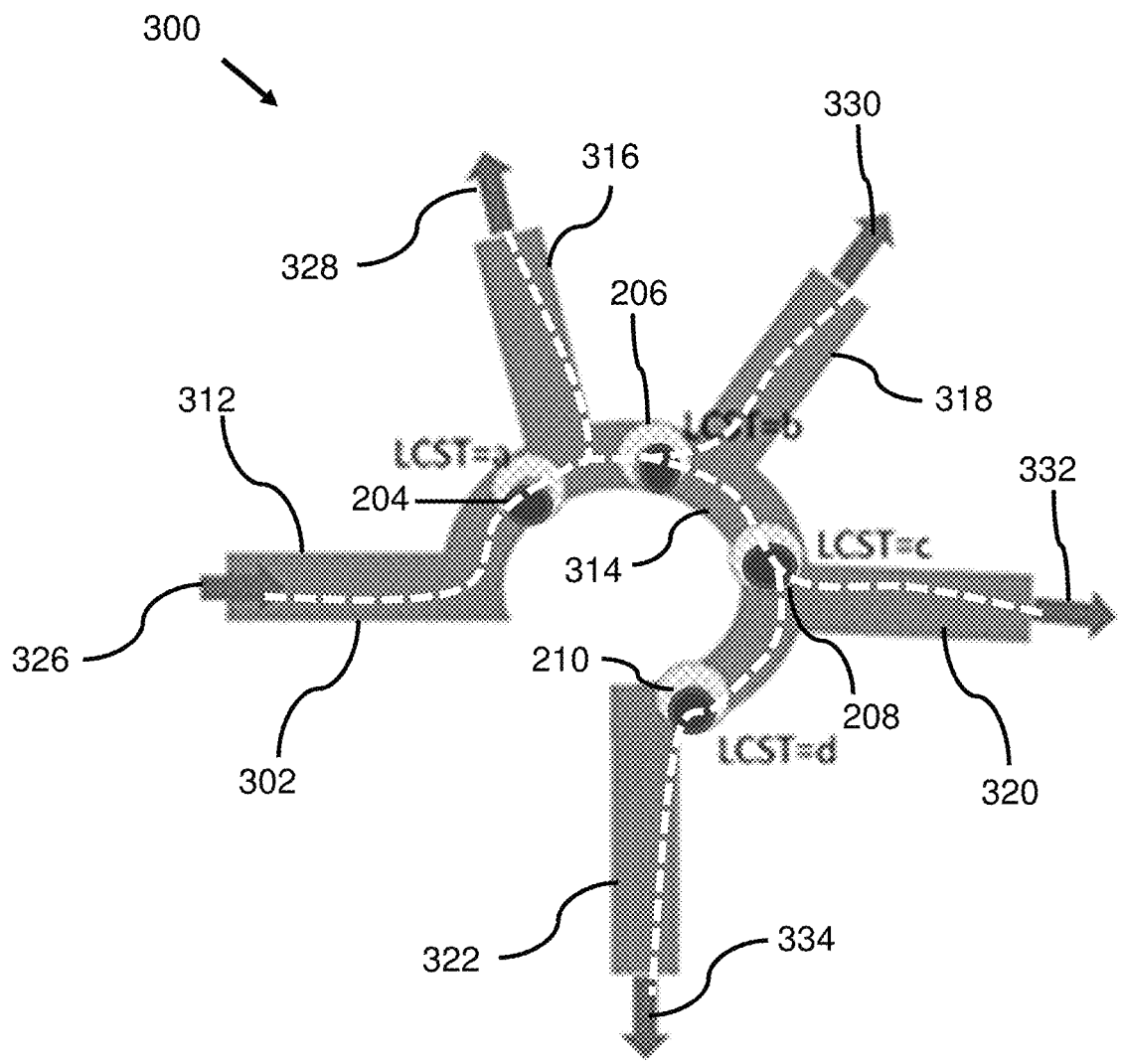
FIG. 3 illustrates another fluid distribution system in accordance with aspects of the present disclosure.

FIG. 3 illustrates another fluid distribution system 300 in accordance with aspects of the present disclosure.

As shown in the figure, fluid distribution system 300 includes a fluid channel 302, and fluid controlling systems 204, 206, 208, and 210. Further, fluid channel 302 includes an input portion 312, a central connecting portion 314, a branch 316, a branch 318, a branch 320 and a branch 322.

Fluid controlling system 204 is disposed within central connecting portion 314, adjacent to branch 316, as opposed to being within branch 316 in a manner similar to that discussed above with reference to FIG. 2A. Similarly, fluid controlling system 206 is disposed within central connecting portion 314, adjacent to branch 318. Fluid controlling system 208 is disposed within central connecting portion 314, adjacent to branch 320. Fluid controlling system 210 is disposed within central connecting portion 314, adjacent to branch 322.

As shown in the figure, fluid distribution system 300 is similar to fluid distribution system 200 as discussed above with reference to FIGS. 2A-E. However, fluid distribution system 300 illustrates that the fluid controlling systems may be disposed at many different locations within a fluid channel system in order to passively control the flow of the fluid within the fluid channel system using only the temperature of the fluid within the fluid channel system.

Further, both non-limiting example systems discussed above with reference to FIGS. 2A-3 take the form of a "hub and spoke" fluid channel system. However, other system shapes may use fluid controlling systems in accordance with aspects of the present disclosure. Another non-limiting example will be described in greater detail with reference to FIG. 4.

Figure 4:
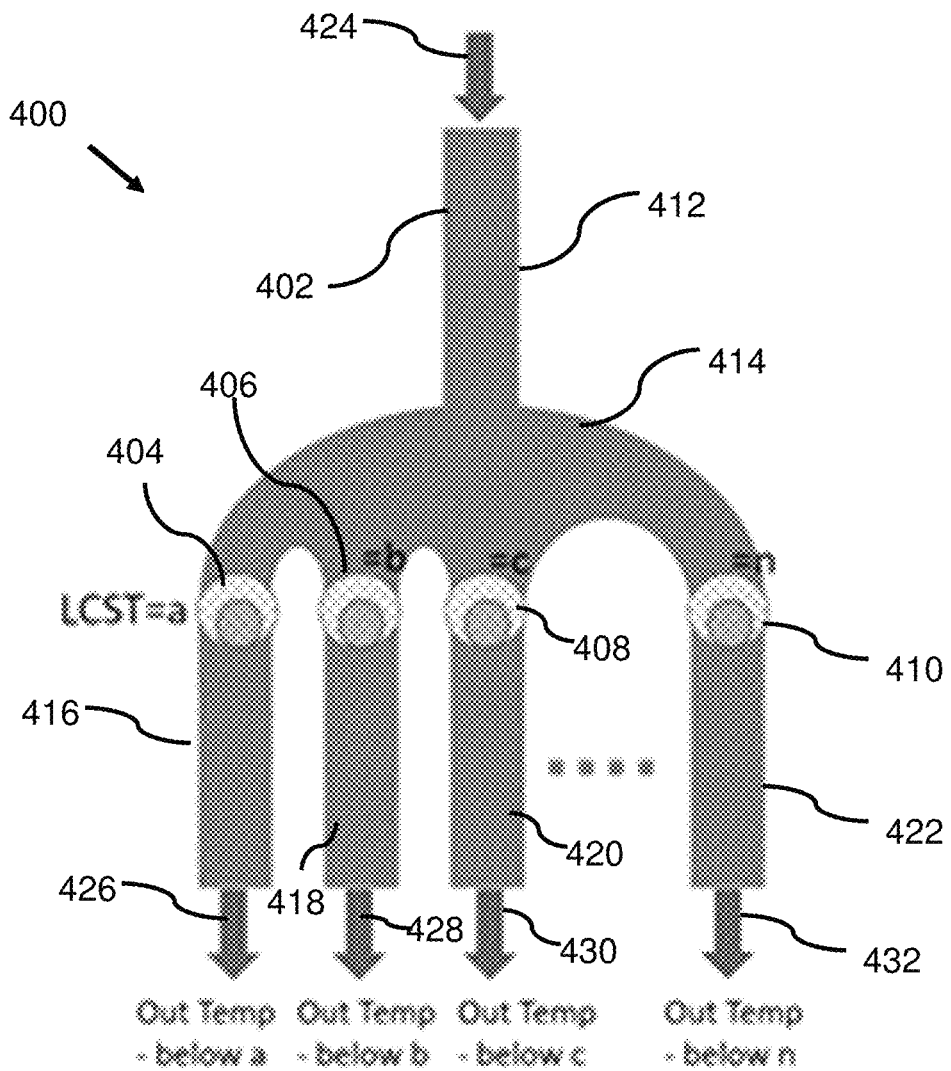
FIG. 4 illustrates another fluid distribution system in accordance with aspects of the present disclosure.

FIG. 4 illustrates another fluid distribution system 400 in accordance with aspects of the present disclosure.

As shown in the figure, fluid distribution system 400 includes a fluid channel 402, and an integer number n of fluid controlling systems, a sample of which are indicated as fluid control systems 404, 406, 408, and 410. Further, fluid channel 402 includes an input portion 412, a central connecting portion 414, and an integer number n of branches, a sample of which are indicated as a branch 416, a branch 418, a branch 420 and a branch 422.

Each of the integer number n of fluid controlling systems has a structure similar to fluid controlling system 102 discussed above with reference to FIGS. 1A-B.

In this example, each branch has a respective fluid controlling system disposed therein. For example, fluid controlling system 404 is disposed within branch 416, fluid controlling system 406 is disposed within branch 418, fluid controlling system 408 is disposed within branch 420, and fluid controlling system 410 is disposed within branch 422.

Fluid distribution system 400 is configured to distribute fluid to different branches, each of which may lead to a different downstream system (not shown), respectively. For purposes of discussion let: the TRP in fluid controlling system 404 have a LCST of a value a; the TRP in fluid controlling system 406 have a LCST of a value b; the TRP in fluid controlling system 408 have a LCST of a value c; and the TRP in fluid controlling system 410 have a LCST of a value d; wherein a>b>c>d. Further, in this example, let a=50 degrees Celsius, let b=40 degrees Celsius, let c=20 degrees Celsius, and let d<20 degrees Celsius.

As such, when the temperature, T, of the fluid in fluid distribution system 400 is greater than 50 degrees Celsius, each of fluid controlling system 404, 406, 408, and 410 are in a closed state, wherein the respective TRP has expanded to "close off" the respective branch.

When T of the fluid in fluid distribution system 400 is less than 50, each of fluid controlling system 406, 408, and 410 remains in a closed state, but fluid controlling system 404 transitions to an open state, wherein the TRP in fluid controlling system 404 contracts. When the TRP in fluid controlling system 404 contracts, fluid 424 provided to input portion 412 flows into central connecting portion 414, is able to flow through fluid controlling system 404 into branch 416, and then continue downstream as indicated by arrow 426. As such, the fluid flowing through branch 416 is less than 50 but greater than 40.

When T of the fluid in fluid distribution system 400 is less than 40, each of fluid controlling system 408, and 410 remains in a closed state, but fluid controlling system 404 remains in an open state, and fluid controlling system 406 transitions to an open state, wherein the TRP in fluid controlling system 406 contracts. When the TRP in fluid controlling system 406 contracts, a portion of fluid 424 continues to flow through fluid controlling system 404 into branch 416, and then continues downstream as indicated by arrow 426. Further, the remaining portion of fluid 424 flows through fluid controlling system 406 into branch 418, and then continues downstream as indicated by arrow 428. As such, the fluid flowing through branches 416 and 418 is less than 40 but greater than 30.

When T of the fluid in fluid distribution system 400 is less than 30, fluid controlling system 410 remains in a closed state, but fluid controlling systems 404 and 406 remain in an open state, and fluid controlling system 408 transitions to an open state, wherein the TRP in fluid controlling system 408 contracts. When the TRP in fluid controlling system 408 contracts, a portion of fluid 424 continues to flow through fluid controlling systems 404 and 406 into branches 416 and 418, respectively, and then continues downstream as indicated by arrows 426 and 428, respectively. Further, the remaining portion of fluid 424 flows through fluid controlling system 408 into branch 420, and then continues downstream as indicated by arrow 430. As such, the fluid flowing through branches 416, 418, and 420 is less than 30 but greater than 20.

This passive controlling of the fluid distribution throughout the plurality of channels may continue until finally fluid controlling system 410 transitions to an open state. In that case, fluid 424 may be distributed to all channels of fluid distribution system 400.

A fluid distribution system in accordance with aspects of the present disclosure, for example those discussed above with reference to FIGS. 2A-4, may passively distribute fluid to distinct portions of the fluid distribution system based on the temperature of the fluid itself. This type of system may be useful when certain downstream systems may be particularly vulnerable to high temperature fluids. In this manner, such vulnerable downstream systems may be passively protected from high temperature fluids using a fluid controlling system in accordance with the present disclosure.

In accordance with another aspect of the present disclosure, a chiller may be incorporated into a fluid distribution system to actively cool the fluid therein, thus accelerating transitioning time of a fluid controlling system. This will be described in greater detail with reference to FIGS. 5A-D.

Figure 5A:
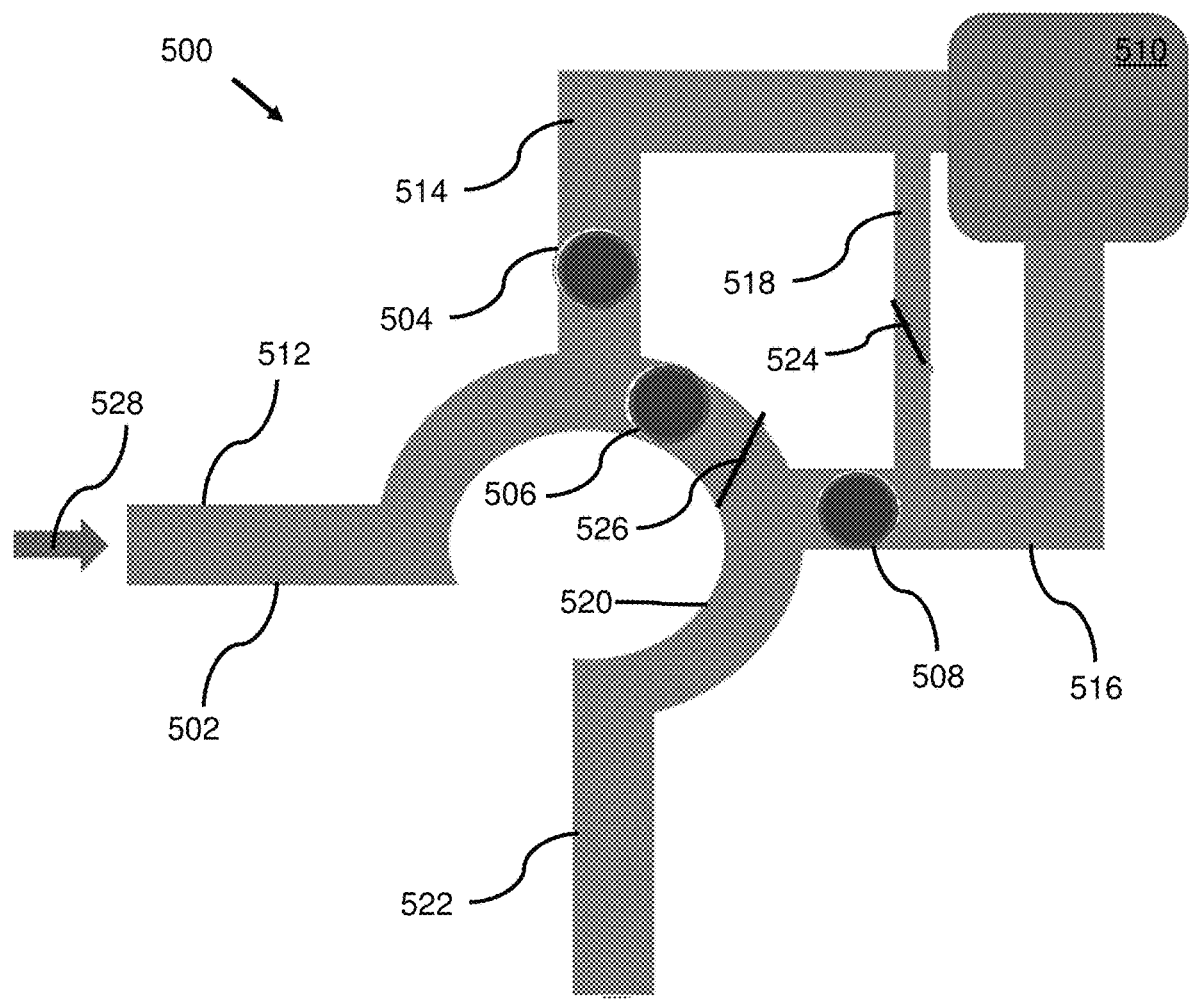
FIG. 5A illustrates another fluid distribution system in accordance with aspects of the present disclosure at a time, $t_7$.

FIG. 5A illustrates another fluid distribution system 500 in accordance with aspects of the present disclosure at a time, $t_7$.

As shown in the figure, fluid distribution system 500 includes a fluid channel 502, fluid controlling systems 504, 506, and 508, and a chiller 510. Further, fluid channel 502 includes an input portion 512, a branch 514, a branch 516, a branch 518, a central connecting portion 520, and a branch 522. Fluid distribution system 500 additionally includes a reverse check valve 524 within branch 518 and a reverse check valve 526 within central connecting portion 520.

Fluid controlling system 504 is disposed within branch 514. Fluid controlling system 506 is disposed within central connecting portion 520, between branch 514 and branch 516. Fluid controlling system 508 is disposed within branch 516.

Each of fluid controlling systems 504, 506, and 508 have a similar structure to that of fluid controlling system 102 discussed above with reference to FIGS. 1A-B. However, in this embodiment, the TRP in each of fluid controlling systems 504, 506, and 508 are configured to expand at a different respective LCST.

In operation, fluid distribution system 500 is able to maintain the outflow temperature of fluid at a desired level.

For purposes of discussion only, at time $t_7$, let the temperature of fluid entering input portion 512, as shown by arrow 528, be higher than the LCST of fluid controlling system 504. Further, let: the TRP of fluid controlling system 504 have an LCST, $T_{504}$, greater than $T_{th}$, the TRP of fluid controlling system 508 have an LCST, $T_{508}$, be equal to $T_{th}$, and the TRP of fluid controlling system 506 have an LCST, $T_{506}$, be between $T_{504}$ and $T_{508}$, i.e., $T_{504} > T_{506} > T_{508}$.

For purposes of discussion, at time $t_7$, let the temperature of the fluid flowing into input portion 512, as shown by arrow 528, have a temperature that is greater than the LCST of fluid controlling systems 504 and 506. Accordingly, the TRP in each of fluid controlling systems 504 and 506 will expanded so as to prevent the fluid from passing into branch 514 or central connecting portion 520.

However, if the temperature of the fluid in central connecting portion 520 were to drop to $T_{504}$, then the fluid will be able to pass into branch 514. This will be described in greater detail with reference to FIG. 5B.

Figure 5B:
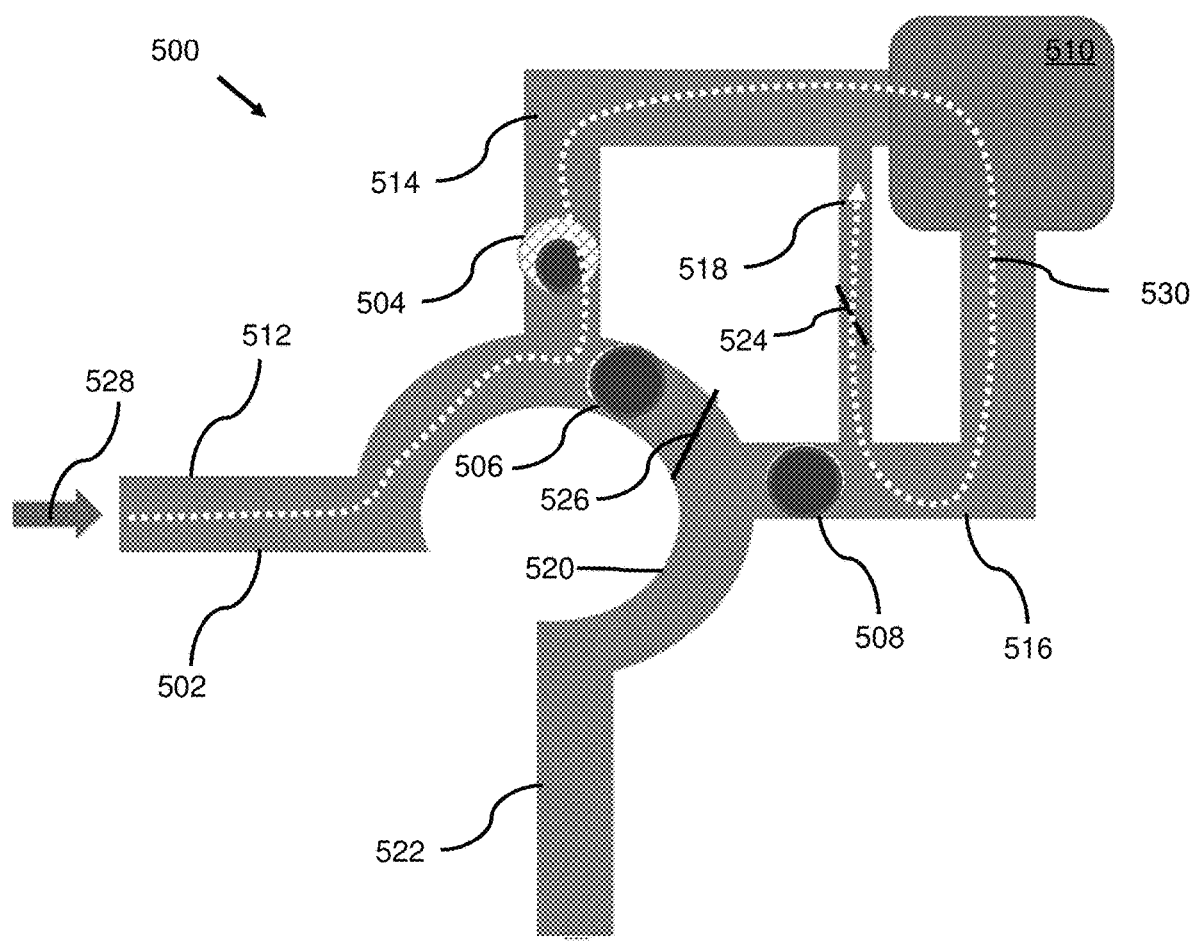
FIG. 5B illustrates the fluid distribution system of FIG. 5A at a time, $t_8$.

FIG. 5B illustrates fluid distribution system 500 at a time, $t_8$. As shown in the figure, the fluid passes through fluid controlling system 504, through branch 514, through chiller 510, and into branch 516. At this point, the temperature of the fluid is higher than the LCST of fluid controlling system 508, $T_{508}$. Accordingly, the TRP of fluid controlling system 508 will expanded so as to prevent the fluid from passing into central connecting portion 520, thus forcing the fluid to flow into branch 518. Reverse check valve 524 enables fluid to flow in the direction indicated by dotted arrow 530, but prevents fluid flow in the opposite direction in branch 518.

Chiller 510 may be any known heat transfer device or system that is able to extract heat from the fluid, thus cooling the fluid. Non-limiting examples of heat transfer devices or systems include any known in-loop fluid chiller. Depending on size of application, it can be microchannel to industry grade chillers.

While the fluid circulates through chiller 510, branch 516, branch 518, past reverse check valve 524 into branch 514, and then again through chiller 510, the temperature of the fluid will decrease. Further, while the temperature of the fluid decreases, it will decrease the temperature of the TRP in fluid controlling system 508 through conduction. Eventually, chiller 510 will cool the fluid to the LCST of the TRP of fluid controlling system 508, $T_{508}$. At this state, the TRP of fluid controlling system 508 will contract. This will be described in greater detail with reference to FIG. 5C.

Figure 5C:
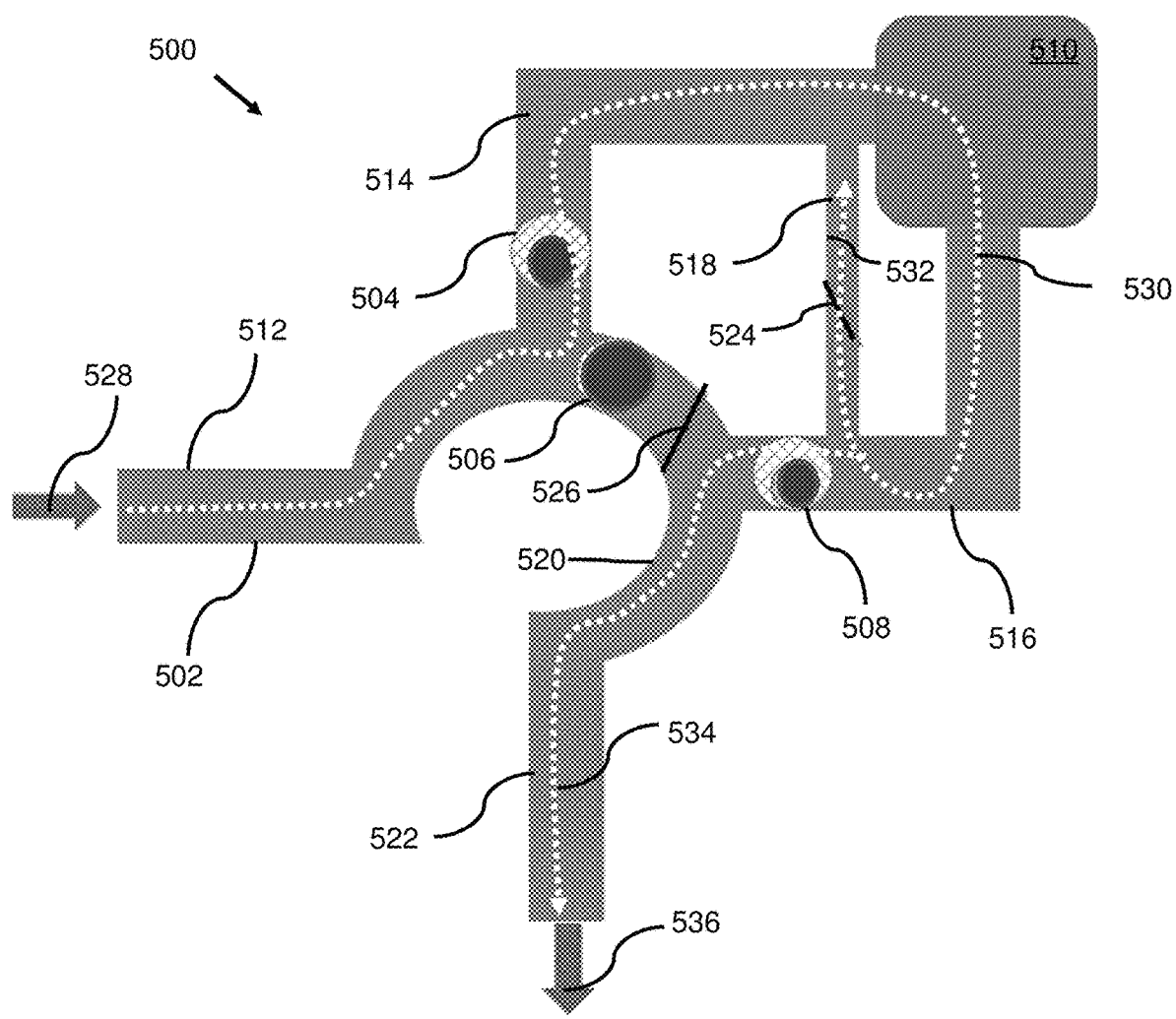
FIG. 5C illustrates the fluid distribution system of FIG. 5A at a time, $t_9$.

FIG. 5C illustrates fluid distribution system 500 at a time, $t_9$. As shown in the figure, the fluid passes through fluid controlling system 504, through branch 514, through chiller 510, and into branch 516. At this point, some of the fluid circulates through chiller 510, branch 516, branch 518, past reverse check valve 524 into branch 514, and then again through chiller 510, as indicated by arrow 532. The temperature of this portion of the fluid will decrease. Another portion of the fluid will flow past fluid controlling system 508, into central connecting portion 520, into branch 522 as indicated by arrow 534, and then further downstream as indicated by arrow 536.

Reverse check valve 524 prevents fluid that passes through fluid controlling system 508 from contacting fluid controlling system 506. In the event that chiller 510 does not sufficiently cool the fluid, the TRP in fluid controlling system 508 will again expand, thus returning fluid distribution system 500 to the state as discussed above with reference to FIG. 5B.

Further, in the event that chiller 510 cools the fluid too much, a portion of the fluid (as shown by arrow 528) that is provided to input portion 512 may be used to increase the overall temperature. This will be described in greater detail with reference to FIG. 5D.

Figure 5D:
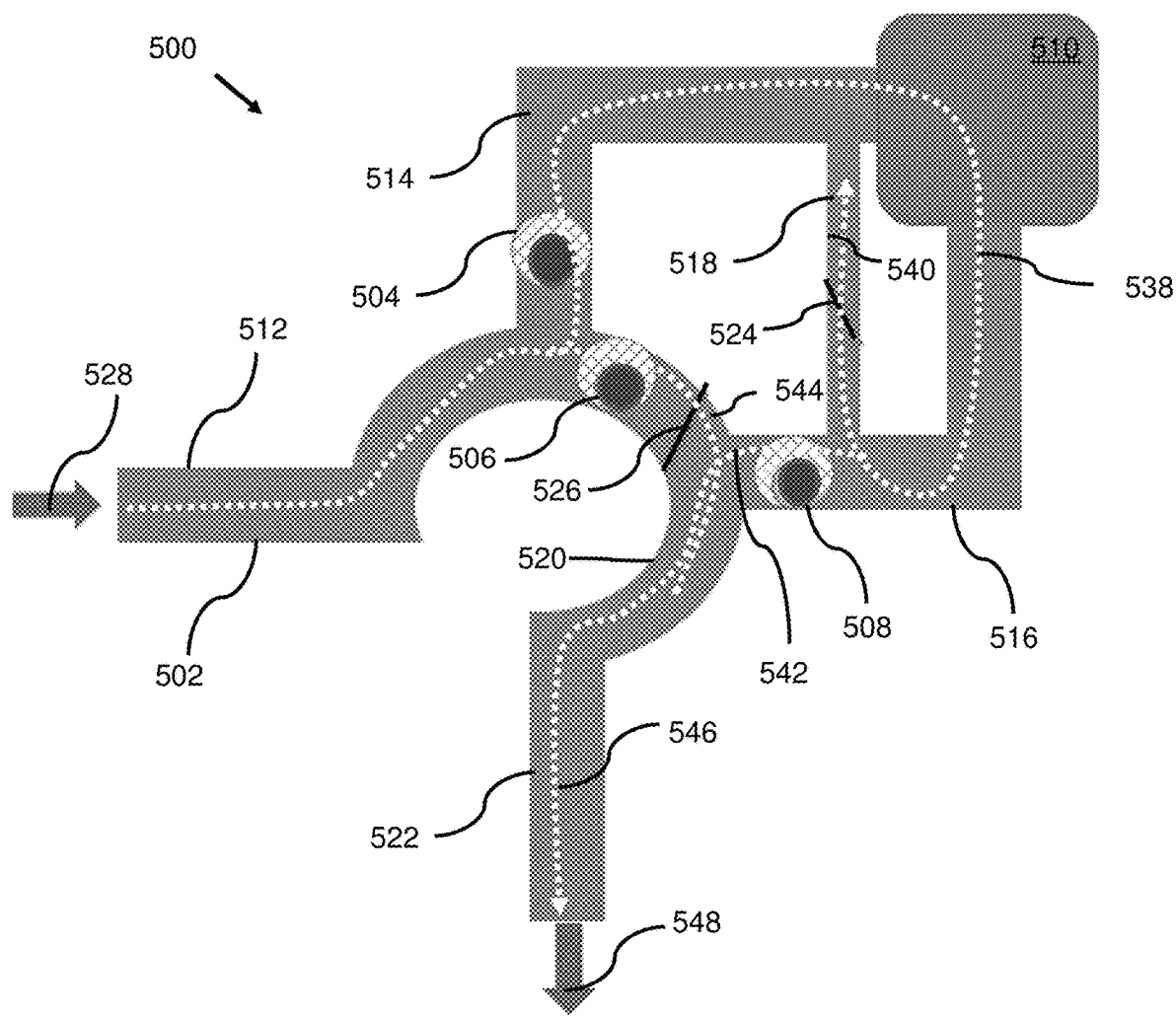
FIG. 5D illustrates the fluid distribution system of FIG. 5A at a time, $t_{10}$.

FIG. 5D illustrates fluid distribution system 500 at a time, $t_{10}$. In this situation, the LCST of the TRP of fluid controlling system 504, $T_{504}$, is less than LCST of the TRP of fluid controlling system 506, $T_{506}$, which is less than LCST of the TRP of fluid controlling system 508, $T_{508}$, i.e., $T_{504} < T_{506} < T_{508}$. In other words, fluid controlling system 504 will open at the highest temperature, fluid controlling system 508 will open at the lowest temperature, and fluid controlling system 506 will open at a temperature that is lower than that of fluid controlling system 504 but higher than that of fluid controlling system 508.

As shown in the figure, each of fluid controlling system 504, fluid controlling system 506 and fluid controlling system 508 are open. Accordingly, the fluid passes through fluid controlling system 504, wherein a portion through branch 514, through chiller 510, and into branch 516 so as to be chilled as shown by arrow 538. At this point, some of the chilled fluid circulates through branch 516, branch 518, past reverse check valve 524 into branch 514, and then again through chiller 510, as indicated by arrow 540. The temperature of this portion of the fluid will further decrease. Similar to that discussed above with reference to FIG. 5C, another portion of the fluid will flow past fluid controlling system 508, into central connecting portion 520 as indicated by arrow 542. Further, a portion of the fluid from input portion 512 will flow past fluid controlling system 506, past reverse check valve 526 as indicated by arrow 544.

The portion of the fluid that flows past fluid controlling system 506 will have a higher temperature than the portion of the fluid that flows past fluid controlling system 508, as that portion of fluid has been cooled by chiller 510. These two portions of fluid mix, thus providing an overall slight increase in the temperature of the total fluid in branch 522, as indicated by arrow 546, which then flows further downstream as indicated by arrow 548.

In other words, in the state discussed above with reference to FIG. 5C, the temperature of the fluid that is input into fluid distribution system 500 may be chilled by chiller 510 such that the fluid output from fluid distribution system 500 has a decreased temperature. In order to prevent the temperature of the fluid output from fluid distribution system 500 from decreasing below a predetermined lower temperature threshold, $T_{LTH}$, the respective TRP of each of fluid controlling systems 504, 506, and 508 are chosen so as to enable fluid controlling system 506 to open to permit a portion of the higher-temperature fluid from input portion 512 to mix with the chilled fluid from branch 516, thus preventing the temperature of the fluid output from fluid distribution system 500 from decreasing below a predetermined lower temperature threshold, $T_{LTH}$.

Prior art fluid distribution systems that distribute fluid based on fluid temperature use mechanically or electronically controllable valves to distribute the fluid through different branches. Such mechanically and electronically controllable valves increase the cost and complexity of the fluid distribution system. Further, such mechanically and electronically controllable valves are subject to wear and tear, and eventually must be replaced or serviced, thus increasing the overall operating cost of the fluid distribution system.

Some prior art fluid distribution systems have used TRPs as valves to control distribution of fluid. However, these prior art fluid distribution systems have used active heating elements, such as Peltier devices to control the TRPs. This combination of active heating elements and the TRPs increase the cost of the system. Further, the active heating elements require energy to operate, such as electricity, which further increases the operating cost of the system.

A fluid distribution system in accordance with aspects of the present disclosure employs a TRP in a passive fluid control system to act as a valve. Accordingly, the residual temperature of the fluid in the fluid distribution system is used to control the expansion and retractions of a TRP in a passive fluid control system in order to control distribution of the fluid throughout the fluid distribution system. This passive fluid control system therefore has a decreased cost and cost of operation as compared to the prior art fluid distribution systems.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to enable others skilled in the art to best utilize the invention in various embodiments and with various modifications as are suited to the particular use contemplated. It is intended that the scope of the invention be defined by the claims appended hereto.

What is claimed is:

1. A system for use with a fluid channel and a fluid, the fluid channel having a cross-sectional area and being configured to pass the fluid, said system comprising:
    a temperature responsive polymer configured to expand to the cross-sectional area when a temperature of the fluid in the fluid channel is greater than or equal to a temperature threshold $T_{th}$, and to retract to less than the cross-sectional area when the temperature of the fluid in the fluid channel is less than $T_{th}$;
    an expandable material layer encasing said temperature responsive polymer and being configured to expand and retract with the expansion and retraction of said temperature responsive polymer; and
    a sieve housing encasing said expandable material and being configured to be disposed in the fluid channel,
    wherein when the temperature of the fluid in the fluid channel is greater than or equal to $T_{th}$, said temperature responsive polymer expands to the cross-sectional area such that said expandable material layer prevents the fluid in the fluid channel from passing through said sieve housing, and
    wherein when the temperature of the fluid in the fluid channel is less than $T_{th}$, said temperature responsive polymer retracts to less than the cross-sectional area such that said expandable material layer enables the fluid in the fluid channel to pass through said sieve housing.

2. The system of claim 1, further comprising:
    a second temperature responsive polymer configured to expand to the cross-sectional area when a temperature of the fluid in the fluid channel is greater than or equal to a second temperature threshold $T_{th2}$, and to retract to less than the cross-sectional area when the temperature of the fluid in the fluid channel is less than $T_{th2}$;
    a second expandable material layer encasing said second temperature responsive polymer and being configured to expand and retract with the expansion and retraction of said second temperature responsive polymer; and
    a second sieve housing encasing said second expandable material,
    wherein when the temperature of the fluid in the fluid channel is greater than or equal to $T_{th2}$, said second temperature responsive polymer expands to the cross-sectional area such that said second expandable material layer prevents the fluid in the fluid channel from passing through said second sieve housing, and
    wherein when the temperature of the fluid in the fluid channel is less than $T_{th2}$, said second temperature responsive polymer retracts to less than the cross-sectional area such that said second expandable material layer enables the fluid in the fluid channel to pass through said second sieve housing.

3. The system of claim 2, wherein $T_{th} \ne T_{th2}$.

4. The system of claim 1,
    wherein when the temperature of the fluid, as a liquid, in the fluid channel is greater than or equal to $T_{th}$, said temperature responsive polymer expands to the cross-sectional area such that said expandable material layer prevents the fluid, as a liquid, in the fluid channel from passing through said sieve housing, and
    wherein when the temperature of the fluid, as a liquid, in the fluid channel is less than $T_{th}$, said temperature responsive polymer retracts to less than the cross-sectional area such that said expandable material layer enables the fluid, as a liquid, in the fluid channel to pass through said sieve housing.

5. The system of claim 1,
    wherein when the temperature of the fluid, as a gas, in the fluid channel is greater than or equal to $T_{th}$, said temperature responsive polymer expands to the cross-sectional area such that said expandable material layer prevents the fluid, as a gas, in the fluid channel from passing through said sieve housing, and
    wherein when the temperature of the fluid, as a gas, in the fluid channel is less than $T_{th}$, said temperature responsive polymer retracts to less than the cross-sectional area such that said expandable material layer enables the fluid, as a gas, in the fluid channel to pass through said sieve housing.

6. A fluid distribution system for use with a fluid, said fluid distribution system comprising:
    a fluid channel having a cross-sectional area and being configured to pass the fluid;
    a temperature responsive polymer configured to expand to the cross-sectional area when a temperature of the fluid in said fluid channel is greater than or equal to a temperature threshold $T_{th}$, and to retract to less than the cross-sectional area when the temperature of the fluid in said fluid channel is less than $T_{th}$,
    an expandable material layer encasing said temperature responsive polymer and being configured to expand and retract with the expansion and retraction of said temperature responsive polymer; and
    a sieve housing encasing the expandable material and being configured to be disposed in said fluid channel,
    wherein when the temperature of the fluid in said fluid channel is greater than or equal to $T_{th}$, said temperature responsive polymer expands to the cross-sectional area such that said expandable material layer prevents the fluid in said fluid channel from passing through said sieve housing, and
    wherein when the temperature of the fluid in said fluid channel is less than $T_{th}$, said temperature responsive polymer retracts to less than the cross-sectional area such that said expandable material layer enables the fluid in said fluid channel to pass through said sieve housing.

7. The system of claim 6, further comprising:
    a second temperature responsive polymer configured to expand to the cross-sectional area when a temperature of the fluid in said fluid channel is greater than or equal to a second temperature threshold $T_{th2}$, and to retract to less than the cross-sectional area when the temperature of the fluid in said fluid channel is less than $T_{th2}$;
    a second expandable material layer encasing said second temperature responsive polymer and being configured to expand and retract with the expansion and retraction of said second temperature responsive polymer; and a second sieve housing encasing said second expandable material, wherein when the temperature of the fluid in said fluid channel is greater than or equal to $T_{th2}$, said second temperature responsive polymer expands to the cross-sectional area such that said second expandable material layer prevents the fluid in said fluid channel from passing through said second sieve housing, and wherein when the temperature of the fluid in said fluid channel is less than $T_{th2}$, said second temperature responsive polymer retracts to less than the cross-sectional area such that said second expandable material layer enables the fluid in said fluid channel to pass through said second sieve housing.

8. The system of claim 7, wherein $T_{th} \neq T_{th2}$.

9. The system of claim 7, further comprising a flow activated chiller disposed between the sieve housing and the second sieve housing and configured to cool a portion of the fluid between the sieve housing and the second sieve housing.

10. The system of claim 9, wherein $T_{th} > T_{th2}$.

11. The system of claim 10, further comprising a reverse check valve configured to prevent the fluid from flowing from the second sieve housing to the sieve housing.

12. The system of claim 6,
wherein when the temperature of the fluid, as a liquid, in said fluid channel is greater than or equal to $T_{th}$, said temperature responsive polymer expands to the cross-sectional area such that said expandable material layer prevents the fluid, as a liquid, in said fluid channel from passing through said sieve housing, and wherein when the temperature of the fluid, as a liquid, in said fluid channel is less than $T_{th}$, said temperature responsive polymer retracts to less than the cross-sectional area such that said expandable material layer enables the fluid, as a liquid, in said fluid channel to pass through said sieve housing.

13. The system of claim 6,
wherein when the temperature of the fluid, as a gas, in said fluid channel is greater than or equal to $T_{th}$, said temperature responsive polymer expands to the cross-sectional area such that said expandable material layer prevents the fluid, as a gas, in said fluid channel from passing through said sieve housing, and wherein when the temperature of the fluid, as a gas, in the fluid channel is less than $T_{th}$, said temperature responsive polymer retracts to less than the cross-sectional area such that said expandable material layer enables the fluid, as a gas, in said fluid channel to pass through said sieve housing.

14. A method of distributing fluid, said method comprising:

flowing fluid into a fluid channel having a cross-sectional area and being configured to pass the fluid; and flowing the fluid to a device within the fluid channel, the device including:

a temperature responsive polymer configured to expand to the cross-sectional area when a temperature of the fluid in the fluid channel is greater than or equal to a temperature threshold $T_{th}$, and to retract to less than the cross-sectional area when the temperature of the fluid in the fluid channel is less than $T_{th}$;

an expandable material layer encasing the temperature responsive polymer and being configured to expand and retract with the expansion and retraction of the temperature responsive polymer; and a sieve housing encasing the expandable material and being configured to be disposed in the fluid channel, wherein when the temperature of the fluid in the fluid channel is greater than or equal to $T_{th}$, the temperature responsive polymer expands to the cross-sectional area such that the expandable material layer prevents the fluid in the fluid channel from passing through the sieve housing, and wherein when the temperature of the fluid in the fluid channel is less than $T_{th}$, the temperature responsive polymer retracts to less than the cross-sectional area such that the expandable material layer enables the fluid in the fluid channel to pass through the sieve housing.

15. The method of claim 14, further comprising:
flowing the fluid to a second device within the fluid channel, the second device including:

a second temperature responsive polymer configured to expand to the cross-sectional area when a temperature of the fluid in the fluid channel is greater than or equal to a second temperature threshold $T_{th2}$, and to retract to less than the cross-sectional area when the temperature of the fluid in the fluid channel is less than $T_{th2}$;

a second expandable material layer encasing the second temperature responsive polymer and being configured to expand and retract with the expansion and retraction of the second temperature responsive polymer; and a second sieve housing encasing the second expandable material, wherein when the temperature of the fluid in the fluid channel is greater than or equal to $T_{th2}$, the second temperature responsive polymer expands to the cross-sectional area such that the second expandable material layer prevents the fluid in the fluid channel from passing through the second sieve housing, and wherein when the temperature of the fluid in the fluid channel is less than $T_{th2}$, the second temperature responsive polymer retracts to less than the cross-sectional area such that the second expandable material layer enables the fluid in the fluid channel to pass through the second sieve housing.

16. The method of claim 15, wherein $T_{th} \neq T_{th2}$.

17. The method of claim 15, further comprising flowing the fluid through a flow activated chiller disposed between the sieve housing and the second sieve housing and configured to cool a portion of the fluid between the sieve housing and the second sieve housing.

18. The method of claim 17, wherein $T_{th} > T_{th2}$.

19. The method of claim 18, further comprising flowing the fluid through a reverse check valve configured to prevent the fluid from flowing from the second sieve housing to the sieve housing.

20. The method of claim 14,
wherein when the temperature of the fluid, as a liquid, in the fluid channel is greater than or equal to $T_{th}$, the temperature responsive polymer expands to the cross-sectional area such that the expandable material layer prevents the fluid, as a liquid, in the fluid channel from passing through the sieve housing, and wherein when the temperature of the fluid, as a liquid, in the fluid channel is less than $T_{th}$, the temperature responsive polymer retracts to less than the cross-sectional area such that the expandable material layer enables the fluid, as a liquid, in the fluid channel to pass through the sieve housing.

\* \* \* \* \*